May 26, 1931.  W. BOCK ET AL  1,807,190
ELECTRIC REGULATION SYSTEM
Original Filed March 3, 1928
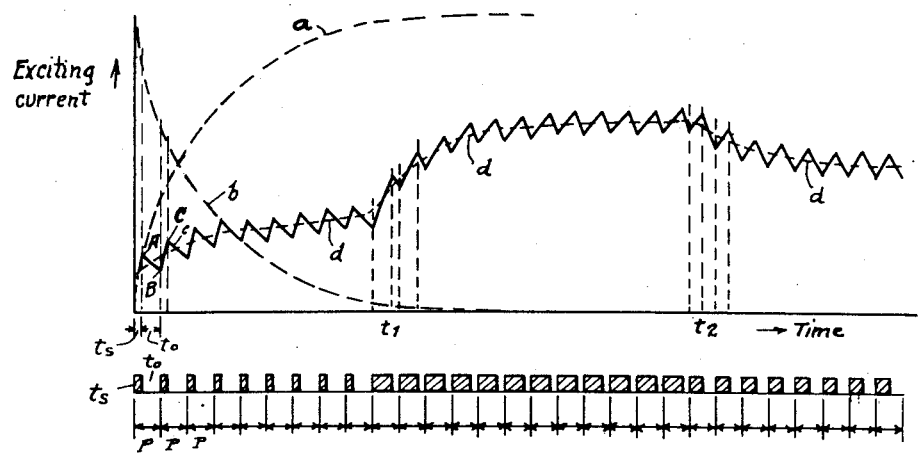
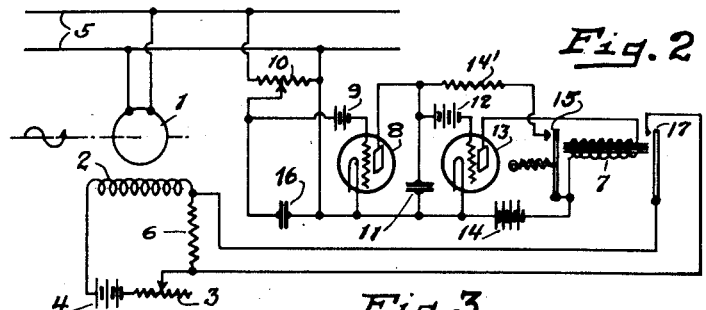
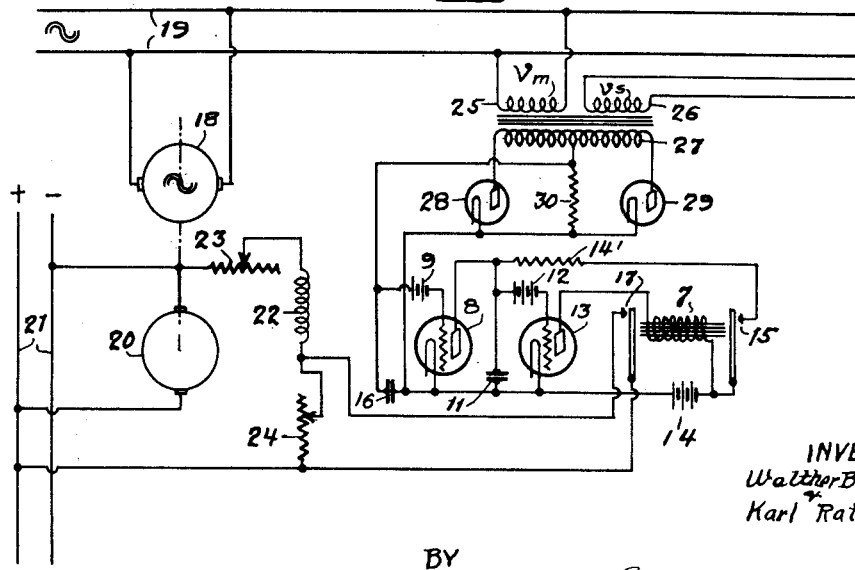
INVENTORS
Walther Bock
 & 
Karl Rath
BY
Samuel Ostrolenk
ATTORNEY Patented May 26, 1931

1,807,190

UNITED STATES PATENT OFFICE

WALTHER BOCK, OF BERLIN-STEGLITZ, GERMANY AND KARL RATH, OF NEW YORK, N. Y., ASSIGNORS TO C. LORENZ, A. G., OF BERLIN-TEMPELHOF, GERMANY

ELECTRIC REGULATION SYSTEM

Original application filed March 3, 1928, Serial No. 261,095, and in Germany April 1, 1927. Divided and this application filed March 21, 1930. Serial No. 437,901.

This application, which is a division of application Serial No. 261,095, filed March 3rd, 1928 now Patent Number 1,767,236, June 24, 1930, refers to an electrical regulator operating according to the fast regulating or Tirrill principle. The main object of the invention is to replace the mechanical arrangement for controlling the vibrations and the regulating influence by a more accurate and precise electric control of said vibrations.

Another object of this invention is to make the closing and opening of regulating influence by purely electrical forces, and not by mechanical means.

Another object is to have an electrical relay for applying and withdrawing the regulating action, thereby increasing the speed and accuracy of regulation.

A further object is to introduce vacuum tube control for a relay to secure a greater sensitivity of response of the vibration regulator to variations in the magnitude to be regulated.

The invention is further described with reference to the accompanying drawings, which illustrate as follows:

Figure 1 is a diagrammatic representation of the operation of vibration regulator with reference to the duration of time periods of regulating influence.

Figure 2 is a diagram of connections suitable for carrying out the object of our invention, for the purpose of controlling the output voltage of a generator.

Figure 3 is a similar arrangement to keep the frequency of an alternating current generator constant.

The invention will be described with a short reference to the present art of regulation. Referring to the regulation of electrical current, for instance, the excitation current of an electrical machine for the purpose of keeping constant the pressure or the speed, or else for the purpose of synchronizing, there are fundamentally two distinct methods.

The first is the so-called slow regulation which consists of an arrangement in which the regulating mechanism begins to act only after a change has occurred in the magnitude to be influenced and regulated (that is, in this case, of the current). This regulating mechanism exercises only then a corresponding regulating influence so that meanwhile the magnitude to be regulated may already have passed through a further change and in that way the regulating influence lags behind the change; hence, the name, slow regulation. Such a regulation, even when used as rough in connection with more definite regulation, can only apply to small and slow changes of the magnitude to be held constant, and fails entirely when it is a case of extreme precision, as, for instance, for speed regulation of electrical machines for generation of high frequency current or for securing synchronous operation of several devices, or else when it is a question of generating extremely constant voltages, such as for measuring purposes.

For such uses the only method that need be practically considered is the other already well-known art of regulation, to which this present invention also refers, and which, therefore, may be called fast regulation, also known under the term of regulation according to the Tirrill principle. This method is already utilized for regulation of voltages by the well-known Tirrill voltage regulator for electric generators, and lately also for keeping constant the speed of the machine by the so-called Schmidt's centrifugal contact regulator, as described in U. S. Patent No. 1,647,030. The principle of this regulating method consists in the fact that the permanent, that is also the normal condition, such as the correct value of the magnitude to be kept constant (pressure or speed) has a regulating influence periodically applied to and withdrawn from it, so that even with the very inception of a change of the magnitude to be kept constant, the regulating action is fully exercised and the regulating force is thereby immediately released without any noticeable delay.

There is a further distinction of such a regulating method as against the above mentioned slow regulation, in which the main disadvantage, among other disadvantages, is the transient phenomena following the changes in current. This distinction is that such transient phenomena disturbing the regulating procedure are practically excluded, especially the influence of the inductance of the windings such as excited windings. This is made possible by using the so-called over regulation; that is, that the regulating influence is made several times bigger than is necessary for producing the normal condition. At the same time this excessive regulating force cannot exercise its full action, since it is forcibly applied and withdrawn during short intervals of time only. By this means the advantage is secured that the delay phenomena are practically entirely exhausted and an instaneous regulating influence is obtained.

The required forced periodic application and withdrawal of regulation have in the present-day arrangements been secured in a mechanical manner, such as by spring contact means. This is, for instance, the case in the above referred to Tirrill voltage regulator, in which a movable contact arm carrying a contact is closing and opening periodically with a corresponding fixed contact to apply and withdraw the regulating influence. Also, in the speed regulator above referred to, a swinging device carrying the contacts is used in conjunction with a suitable opposite contact, for maintaining the speed. In this case both contacts are forced to close and open at a rate determined by a periodically applied force superimposed on a constant force. Such mechanical arrangements, however, have been found insufficient whenever extreme accuracy is necessary; hence, the object of this invention is to determine the periodic application and withdrawal of regulating influence by electrical forces, rather than by mechanical.

The invention, therefore, consists, briefly, of a device in which a regulating current or voltage derived from the arrangement to be regulated determines, in an electrical manner, the relation of the regulating duration to the regulating suspension duration in a definite regulating period such as, for instance, the relation of opening and closing duration of a relay.

The subject of the invention is made clearer by several practical examples, as in the accompanying drawings, with a further description of individual details. Similar notations in the drawings refer to similar elements.

As an example, in a machine the pressure of which must be equal to or synchronous with another machine, there may be included a resistance in the exciting winding and a suitable voltage applied to said exciting winding (for instance, from a separate source of excitation, or with self-excited machines from the armature terminals). When the circuit is closed, a current will increase according to curve $a$ in the accompanying Figure 1; that is, its final value will be reached only after a certain time, which is determined by the time constant of the circuit. If a value, dependent on the exciting current, such as terminal pressure or speed is to be changed by influencing the exciting current, then it is well known that the regulating action will not occur immediately at its full value, on account of the slowness of the increase in current, but only after a lapse of a definite time. Especially when it is a question of regulating large machines with considerable inductance of its magnetizing winding, this delay may have relatively large value. We have to deal in this case, therefore, with the so-called slow regulation. If, however, a suitably chosen resistance is included in the circuit after a short period of time $t_s$; for instance, by opening the contacts of a shunt circuit, then the current would increase to a point A and would decrease according to curve $b$, which is represented as an inverse of curve $a$. In this way a point B is reached in a short period of time $t_o$. At this instant the resistance is again short circuited by closing of the contacts; that is, it is excluded so that the current will again increase to point C, to be again reduced by a subsequent inclusion of the resistance. With a definite relation between the opening and closing of the contacts; that is, the application and withdrawal of regulating resistance, the current will reach an intermediate value represented by the curve $d$. The very short zigzag oscillations occurring actually around this value are practically of such a small magnitude that their action disappears entirely since it is applied only indirectly to the armature and through this again to the terminal potential or the speed. Up to the time interval which in the drawing is indicated as $t_1$, it is assumed that the intervals of closing of contacts $t_s$ are smaller than the intervals of opening the contacts $t_o$. If now this relation of opening and closing intervals of the contacts and respectively of the application and withdrawal intervals of the regulating resistance are changed, in such a way, for instance, that $t_s$ is larger and $t_o$ is smaller, then the average current $d$ is automatically increased to a higher average value. If later the relation of $t_s$ to $t_o$ is again reduced, as after the instant $t_2$, as illustrated in the drawing, the current again drops. As can be seen, these changes in the average current take place very rapidly; that is, after one or two openings or closing of contact, and this depends, as can readily be seen, on the shape of the curves $a$ and $b$; that is, on the proper dimensioning of the regulating resistance. In the drawing the opening and closing intervals, $t_o$ and $t_s$ respectively, are illustrated for the purpose of survey for the same regulating period $p$. It represents, therefore, in this case a fast regulator which would operate on a vibration principle, and which is the more accurate the more often the change from opening to closing takes place during a unit time.

Figure 2 shows a circuit arrangements according to the invention, in which forced periodic opening and closing of regulating resistance takes place by means of a relay, while the relation of opening and closing intervals which determine the degree of regulating action is controlled in a purely electrical manner by periodic charging and discharging of a condenser. The value of this relation is determined by the magnitude to be held constant. Figure 2 applies specifically to a voltage regulator. Item 1 represents a dynamo machine, which for simplicity is represented as a direct current machine with separate excitation. Item 2 is the magnet winding, 3 is the regulating resistance, and 4 is a separate source of energy for securing the constant exciting field. The machine supplies the network 5. A regulating resistance 6 is connected in the exciting circuit of the machine and is switched in and out periodically by means of a relay 7, in such a way that there is an average exciting current corresponding to the relation of opening and closing intervals of the relay 7, as described in connection with Figure 1. By this means there is secured quite a definite terminal potential on the machine 1. According to this invention, the control of opening and closing intervals of relay 7 takes place as follows:—

In the grid circuit of a tube 8 there is a condenser 16, together with a suitable source of biasing potential 9. This condenser is connected at one terminal to the resistance 10 which lies across the network potential and is thereby charged to a potential dependent on the terminal potential of machine 1, which is to be held constant. Since the internal resistance of a tube depends on the potential applied to its grid, the resistance of the tube 8 is quite definitely determined by the terminal potential of machine 1. Thus, if the value of the terminal potential is changed, the grid potential is also changed and thereby also the internal tube resistance; the latter is reduced with the rise of grid potential, and rises with the fall of the grid potential. This changing of the internal tube resistance determines the charging and discharging intervals of condenser 11. This latter is connected to the grid of a second tube 13 in connection with a biasing potential 12. The biasing potential 12 is chosen in such a way that it counteracts the potential 14 representing the source of anode current. The series resistance 14' serves to set the charging interval to a definite value.

Assume now that the contacts 15 of the relay 7 are closed. The condenser 11 is then charged by the battery 14; this eventually makes the potential on the grid of the tube so highly positive that an anode current begins to flow. If this is big enough, the relay 7 is actuated and opens the contact 15, since its winding lies in the anode circuit of the tube. Now the condenser 11 begins to discharge and it will continue to discharge through tube 8 until the potential on the grid of tube 13 has again become so negative that the anode current is thereby suppressed and the armature of the relay 7 drops off again, closing contact 15. The process is then repeated. The charging and discharging of the condenser 11 and thereby the opening and closing of contact 15 is determined according to the value of the potential applied to the grid of tube 8; that is, indirectly according to the terminal potential of machine 1 to be kept constant, and their relation is correspondingly changed. If, for instance, the potential is high, then the resistance of tube 8 is low. Therefore, the charging of the condenser 11 at the closing of the contact 15 takes place slowly, and discharging takes place rapidly, whereby the duration of the closing of contacts is relatively long and the duration of the opening of the contacts is relatively short. If, on the other hand, the grid potential is low (that is, a terminal potential of the machine is reduced) then the resistance of the tube is higher, the charging takes place relatively faster, the discharging takes place relatively slower; in other words, the duration of closing of contact 15 is shorter and the duration of opening correspondingly longer. The movement carried out by contact 15 is similarly carried out by a contact 17 controlled by the same relay 7. This contact in its turn controls the regulating resistance 6 of the exciting circuit of the machine 1 with a similar relation of closing and opening. In the last example, where the machine potential was reduced, it resulted in shortening of the closing duration and a corresponding lengthening of the opening duration of the contact 15, and, therefore, also the increase of the closing duration and respective shortening of the opening duration of contact 17. This would be equivalent, as a glance at Figure 1 would show, to an increase in the average exciting current $d$ in the exciting circuit of the machine, as it is shown, for instance, in Figure 1 after the instant marked $t_1$. The practically instantaneous increase in the average value $d$ of the exciting current of the machine without delay or slowness results in a similar increase of the terminal potential, so that the original potential is thereby maintained.

Figure 3 shows an analgous arrangement using the above described switching arrangement for regulation of the speed or for synchronizing of rotating machines or devices. As an example, Figure 3 refers to keeping accurately constant the speed of a high frequency machine 18, the excitation of which is omitted for the sake of clearness.

The machine supplies an operating circuit 19 (for instance, a wireless installation). The machine is driven by means of a direct current shunt motor 20, the speed of which must be kept extremely constant in order to maintain the frequency of the high frequency alternating source to as constant a value as possible. The driving motor 20 is fed from direct current network 21. Its exciting winding is indicated by 22. Item 23 represents an adjusting resistance in the exciting circuit, and 24 is a regulating resistance corresponding to resistance 6 of Figure 2.

The regulation takes place in such a way that the alternating current of machine frequency $v_m$ and the alternating current from a constant fixed standard frequency $v_s$ are applied to coils 25 and 26 of a differential transformer. The secondary coil 27 of this transformer will then have a resulting current which depends on the relative phase difference of the two currents. This is rectified by means of a two-way double tube rectifying arrangement consisting of valve tubes 28 and 29 and is utilized from the terminals of a resistance 30. The potential of resistance 30 is, therefore, dependent on the resulting current in coil 27, which in its turn, as described above, depends on the relative phase shift of the two currents of frequencies $v_m$ and $v_s$. Since $v_s$ is standard and is supplied constant, this potential depends on the deviation of frequency $v_m$; that is, the change in the speed of the high frequency machine 18, and respectively driving machine 20.

The potential existing on resistance 30 and corresponding to the definite speed operates now in exactly the same manner as was the case in Figure 2, on an arrangement for controlling a relay which opens and closes the regulating resistance 24 on the driving machine 20. The arrangement consists again of the two tubes 8 and 13, the relay 7 with contacts 15 and 17, grid condenser 16 and controlling condenser 11. Numeral 9 is again the grid biasing battery of the tube 8, and 12 the same for tube 13, while 14 is the anode current source and 14' an adjusting resistance.

If the machine runs the least amount too fast; that is, if the machine frequency $v_m$ is by the least amount larger, then the average superimposed current in the secondary coil 27 would produce in the resistance 30 such a change in potential that with the current setting of the normal phase difference of the two currents of frequency $v_m$ and $v_s$, as well as with the correct relative activation of contacts 15 and 17 of relay 7, the resulting current in the motor exciting circuit would immediately assume a new value, which would bring back the original speed. In the example illustrated; that is, where the speed may have increased, the average exciting current is increased so that the tendency to increase all speed is suppressed at its very inception. If it is necessary to regulate the speed absolutely constant, as in the present example, then the controlling frequency $v_s$ must be practically constant.

While we have shown and described our invention with particular reference to the showing of the drawings, it will be apparent that it is not so limited and that it may be practiced in many ways and is subject to many modifications in the circuit arrangements and instrumentalities employed in carrying out the invention, without departing from the scope thereof, as set forth in the appended claims.

What we claim to be secured by United States Letters Patent is as follows:

1. In a vibration regulator for periodic influencing of a magnitude to be regulated, electrical means for determining the amount of regulation, comprising a relay with contacts, means to periodically operate said contacts for controlling the periodic influencing of said magnitude to be regulated, a condenser, means for charging and discharging said condenser for controlling the ratio of closing to opening period of said relay and further means, dependent on the magnitude to be regulated, to determine the rate of the charging and discharging of said condenser.

2. In a vibration regulator for periodic influencing of a magnitude to be regulated, electrical means for determining the amount of regulation, comprising a device for periodically imposing on and withdrawing a regulating force from the magnitude to be regulated, an electric condenser associated with said device, means for charging and discharging said condenser for controlling the ratio of imposing period to withdrawing period of said regulating force and further means, dependent on the magnitude to be regulated, to determine the rate of the charging and discharging of said condenser.

3. In a vibration regulator for periodic influencing of a magnitude to be regulated, electrical means for determining the amount of regulation, comprising an electric circuit carrying a current adapted to influence said magnitude, a device included in said circuit for alternately imposing on and withdrawing an additional current variation from said circuit, an electric condenser, means for charging and discharging said condenser to control the ratio of said imposing to withdrawing periods and further means, dependent on the magnitude to be regulated, to determine the rate of the charging and discharging of said condenser.

4. In a vibration regulator for periodic influencing of a magnitude to be regulated, electrical means for determining the amount of regulation, comprising an electric circuit carrying a current adapted to influence said magnitude, a relay with contacts, means for periodically opening and closing said contacts for imposing on and withdrawing an additional current variation from said circuit, a condenser, means associated with said first means for alternately charging and discharging said condenser for controlling the ratio of closing period to opening period of said relay contacts and further means, dependent on the magnitude to be regulated, to determine the rate of the charging and discharging of said condenser.

5. In a vibration regulator, as described in claim 4, a space discharge device having main electrodes and control electrode associated with said condenser providing a discharge impedance across said main electrodes and means to apply an electric bias on said control electrode, in accordance with variations of the magnitude to be regulated for changing the impedance between said main electrodes for determining the discharge period of said condenser.

6. In a vibration regulator, a space discharge tube, means for securing a voltage, dependent on the magnitude to be regulated, a source of separate biasing voltage for said discharge tube, connections for applying said two voltages in combination to control said discharge tube, a condenser connected to the output circuit of said tube, a source of voltage for said output circuit, a second vacuum tube, connections from said condenser to the input circuit of said second vacuum tube, a relay operated by the output circuit of said second vacuum tube, contacts for said relay to apply said source of voltage to said condenser, whereby said relay opens and closes periodically, further contacts of said relay, an electrical circuit carrying a current adapted to influence said magnitude to be regulated and means to alternately impose on and withdraw an additional current variation from said circuit, in accordance with the operation of said further relay contacts.

7. In a speed regulating system for keeping constant the number of revolutions of the rotating device, comprising an electrical circuit of said device, carrying a current adapted to influence the speed of rotation, a relay self-interrupter including a condenser for determining the ratio of opening to closing periods of said relay, in accordance with its charging and discharging periods, a space charge tube associated with said relay interrupter offering varying impedance for determining said charging and discharging periods of said condenser, a control element of said discharge tube, means to apply a biasing voltage to said control element varying in accordance with variations of the speed of said rotating device for producing corresponding changes of impedance of said space charge tube, a resistor included in said electrical circuit and contacts of said relay connected to said resistor.

8. In a speed regulating system for a rotating body, as described in claim 7, in which said relay interrupter comprises a space charge tube, said relay being included in the output circuit of said space charge tube, further contacts of said relay, the input circuit of said space charge tube being connected in parallel to the output circuit of said first space charge tube and to said condenser, a common source of voltage for supplying the output of both of said discharge tubes, said source of voltage being directly connected to said second discharge tube and being connected to said first discharge tube across said further contacts of said relay and a negative biasing voltage for the input electrode of said second vacuum tube.

9. Means for regulating a rotating device, as to constancy of its speed of rotation and its phase in respect to position in space, comprising in combination an electric circuit of said device carrying a current adapted to influence the speed of rotation, a resistor included in said circuit, means to produce an alternating current having a frequency dependent on the speed of rotation of said device and having a distinct phase relationship in respect thereto, means to supply a controlling alternating current having a frequency and phase corresponding to normal operating conditions of said device, further means to superimpose both of said alternating currents and to derive a resultant current variation, dependent on deviations of phase of said first alternating current in respect to said second alternating current, a relay self-interrupter including a condenser determining the ratio of opening to closing periods in accordance with its charging and discharging, a three-element vacuum tube associated with said relay interrupter for offering varying impedance for determining the charging and discharging of said condenser, means to apply a biasing voltage to the control electrode of said vacuum tube, in accordance with said resultant current variations, for producing corresponding changes of impedance of said vacuum tube, a resistor included in said electric circuit and contacts of said relay connected to said resistor.

10. Means for regulating a rotating body, as described in claim 9, in which said relay interrupter comprises a vacuum tube, said relay being included in the output circuit of said vacuum tube, further contacts of said relay, the input circuit of said vacuum tube being connected in parallel to the output circuit of said first vacuum tube and to said condenser, a common source of voltage for supplying the output of both of said vacuum tubes, said source of voltage being directly connected to said second discharge tube and being connected to said first discharge tube across said further contacts of said relay and a negative biasing voltage for the input electrode of said second vacuum tube.

11. Means for influencing an electric current adapted to determine a magnitude to be regulated, comprising in combination a self-interrupting device, alternately imposing on and withdrawing additional variation from said current, a condenser associated with said interrupter to determine the closing and interrupting periods in accordance with its charging and discharging, a variable impedance device providing a discharge path for said condenser and means to vary the impedance of said last device in accordance with variations of the magnitude to be regulated.

12. A means for translating electric current variations, a first circuit, a means to derive a voltage varying in accordance with current variations in said first circuit, a second circuit, a means to periodically impose on and withdraw addtional current variation from said second circuit, a condenser associated with said last means for determining the ratio of said imposing to withdrawing periods in accordance with its alternating charging and discharging, a variable impedance device included in the discharge path of said condenser, and further means to vary the impedance of said device in accordance with said voltage derived from said first circuit.

13. A means for translating electric current variations, a first circuit, means to derive a voltage varying in accordance with current variations in said circuit, a second circuit carrying an electric current to be influenced in accordance with variations of said first current, a resistor included in said second circuit, a relay interrupter having contacts connected to said resistor for periodically imposing on and withdrawing additional current variation from said second circuit, a condenser associated with said relay interrupter for determining the ratio of interrupting to opening periods of said contacts in accordance with the charging and discharging of said condenser, a vacuum tube having main electrodes and a control electrode, the path between said main electrodes being included in the discharge circuit of said condenser, and further means for varying the bias of said control electrode in accordance with said voltage derived from said first circuit to accordingly change the impedance of said vacuum tube.

In testimony whereof we affix our signatures.

WALTHER BOCK.
KARL RATH.